June 17, 1941.                C. C. FARMER                2,246,201
                              BRAKE MECHANISM
                           Filed Feb. 29, 1940
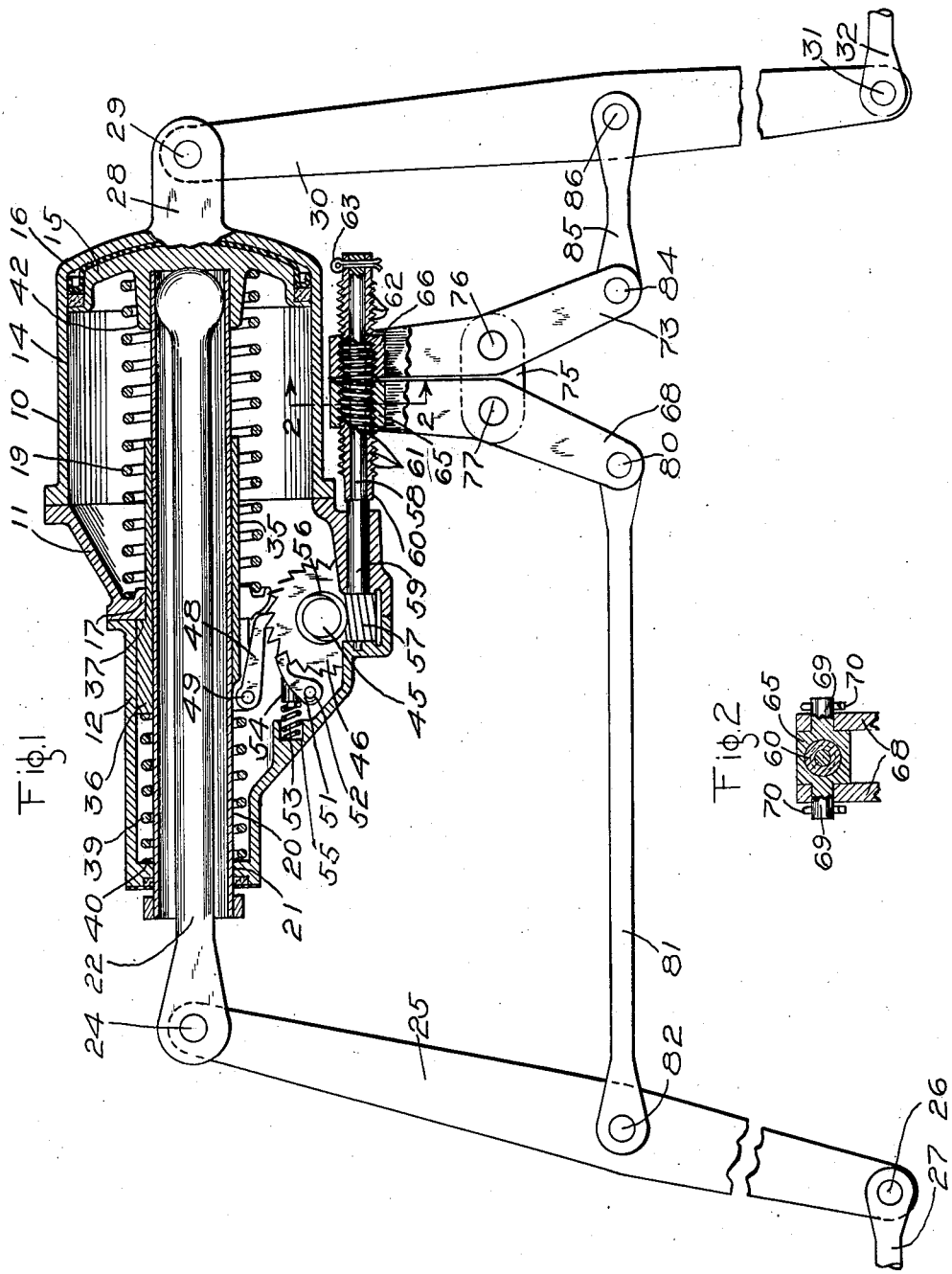
INVENTOR
CLYDE C. FARMER
BY
ATTORNEY Patented June 17, 1941

2,246,201

UNITED STATES PATENT OFFICE 2,246,201

BRAKE MECHANISM

Clyde C. Farmer, Pittsburgh, Pa., assignor to The Westinghouse Air Brake Company, Wilmerding, Pa., a corporation of Pennsylvania Application February 29, 1940, Serial No. 321,466

8 Claims. (Cl. 188—203).

This invention relates to slack adjusters for fluid pressure brakes, and more particularly to a slack adjuster of the type which is automatically operative to take up slack in the brake rigging in response to movement of the usual brake cylinder piston beyond a predetermined range.

Recent developments in the designing of railway trucks have involved the mounting of air brake cylinders and associated brake devices on the truck frame, where space available for accessory devices is necessarily limited. One of the brake accessory devices which has been found difficult to confine within space available on such a truck is the slack adjuster, which is required for adjusting the brake rigging to compensate for wear.

It is the principal object of my invention to provide a slack adjuster mechanism constructed and arranged for operation by a brake cylinder device having a casing structure adapted to have mounted therein both the usual brake cylinder piston and the operating elements of the slack adjuster apparatus.

Another object of the invention is to provide a brake cylinder device including a casing structure adapted to inclose an improved slack adjuster mechanism which is operative in accordance with travel of the brake cylinder piston to adjust elements of the brake rigging associated with the brake cylinder device.

Other objects and advantages of the invention will be apparent in the following more detailed description thereof, taken in conjunction with the accompanying drawing, in which Fig. 1 is a plan view, mainly in section, of a brake cylinder and slack adjuster apparatus constructed in accordance with my invention; and Fig. 2 is a fragmentary sectional view taken substantially along the line 2—2 of Fig. 1.

As shown in Fig. 1 of the drawing, a casing structure is provided for the combined brake cylinder and slack adjuster apparatus and includes a cylinder section 10, an intermediate section 11 and an end section 12, which casing sections are clamped together by suitable means, such as bolts, not shown. The cylinder section 10 of the casing structure has formed therein a bore 14 in which is slidably mounted a piston 15 which is subject at its outer side to the pressure of fluid supplied in the usual manner to a chamber 16 through the medium of a suitable pipe, not shown. Interposed between the piston 15 and an annular shoulder 17 formed on the inner wall of the casing section 11 is a coil spring 19, which normally maintains the piston in brake release position as shown in the drawing. Secured to the piston 15 is a tubular member 20 which extends longitudinally through the casing structure and is slidably mounted in a bore 21 formed in the end section 12 of the casing structure, and which is adapted to receive the usual piston rod 22.

The outer end of the piston rod 22 is pivotally connected by means of a pin 24 to one end of a floating or live brake lever 25, the opposite end of which is operatively connected through the medium of a pin 26 and pull rod 27 with the usual brake rigging elements, not shown. Formed on the cylinder section 10 of the casing structure is a lug 28, which carries a pin 29 that is pivotally connected to one end of a dead brake lever 30. The other end of the lever 30 is pivotally connected by means of a pin 31 to a pull rod 32, which is connected in the usual manner to other members of the brake rigging.

According to the invention, a sleeve element 35 is slidably mounted on the tubular member 20, and is provided with suitable means, not shown, for preventing rotary movement of the sleeve member while permitting longitudinal movement thereof relatively to the tubular member. The sleeve member 35 has an enlarged portion 36 on which is formed an annular surface 37 that is adapted to engage the annular shoulder 17 of the casing section 11 for limiting inward movement of the sleeve member. A coil spring 39 is interposed between the end of the enlarged portion 36 of the sleeve member and an annular shoulder 40 formed on the outer end of the casing section 12, and is adapted to resist movement of the sleeve member during operation thereof by the brake cylinder piston 15, which is provided with a collar portion 42 engageable with the inner end of the sleeve member.

The sleeve member 35 is constructed and arranged to operate a ratchet and gear mechanism comprising a transversely disposed rotary shaft 45, which is suitably journaled in the casing structure and has secured thereto a ratchet wheel 46. A drive pawl 48 is pivotally mounted on the enlarged portion 36 of the sleeve member 35 by means of a pin 49, and is arranged to rest in interlocking engagement with the teeth of the ratchet wheel 46. If desired, suitable spring means, not shown, may be provided for biasing the drive pawl 48 toward its engaged position, it being noted that the pawl is constructed and arranged to ride over the ratchet wheel during movement of the sleeve member 35 to the left, as viewed in Fig. 1.

For preventing counterclockwise rotation of the shaft 45 and ratchet wheel 46 there is provided a stop pawl 51, which is pivotally mounted on a pin 52 carried by the casing structure and is urged into engagement with the teeth of the ratchet wheel under the force of a coil spring 53 that is interposed between a lug 54 formed on the pawl and a recessed wall 55 formed on the casing section 12.

Formed on the rotary shaft 45 is a worm gear portion 56, which is operatively intermeshed with a similar worm gear portion 57 of a shaft 58, which is preferably disposed longitudinally of the brake cylinder casing structure and has a bearing portion 59 journaled in the casing section 11. As shown in the drawing, the shaft 58 extends outwardly of the brake cylinder casing structure, and carries on the outer end thereof a tubular screw member 60, which is arranged to be snugly fitted over the shaft 58 and is secured thereto by means of a cotter pin 63. The screw member 60 is provided with oppositely inclined threads 61 and 62 constituting left-hand and right-hand screw portions.

A pair of adjusting block elements 65 and 66 are operatively mounted on the screw member 60, the block member 65 having a suitably threaded bore for engaging the screw portion 61 and the block member 66 having an oppositely threaded bore fitting the screw portion 62. The adjusting block element 65 is operatively connected to a pair of spacing levers 68, which, as best shown in Fig. 2 of the drawing, are provided with suitable apertures for receiving bearing portions 69 formed on the block element. Locking means, such as cotter pins 70, may be secured to the ends of the bearing portions 69 for preventing displacement of the respective levers 68. Similarly, the adjusting block member 66 has operatively secured thereto a pair of spacing levers 73, which are aligned with the levers 68 and are operatively connected thereto through the medium of a link member 75, which is pivotally connected by means of a pin 76 to the central portions of the levers 73 and by means of a pin 77 to the adjacent portions of levers 68.

As shown in Fig. 1 the respective pairs of spacing levers 68 and 73 are angular in form, so that when the portions of said levers connected to the block elements 65 and 66 are substantially parallel as illustrated, the outer ends of the two pairs of levers are spaced apart. The spacing levers 68 are pivotally connected by means of a pin 80 to the adjacent end of a pull rod 81, the opposite end of which is pivotally connected by means of a pin 82 to the center portion of the brake lever 25. In like manner the adjacent outer ends of the spacing levers 73 are connected by means of a pin 84 to a pull rod 85, the other end of which is journaled on a pin 86 connected to the brake lever 30 intermediate the ends thereof.

In operation, when fluid under pressure is supplied in the usual manner to the piston chamber 16 for effecting an application of the brakes, the brake cylinder piston 15 is moved to the left, as viewed in Fig. 1, against the pressure of the spring 19, while the piston rod 22 is moved in the same direction together with the tubular member 20. It will be understood that the tubular member 20 is free to slide through the sleeve member 35, which is normally maintained in the position illustrated under the force of the coil spring 39.

As the piston rod 22 is thus forced outwardly it operates the brake lever 25 about the pin 82 as a fulcrum to exert a pulling force of the pull rod 27, while at the same time the pin 82 is carried to the left, as viewed in the drawing, so that a pulling force is also transmitted through the medium of the pull rod 81, the interlocked spacing levers 68 and 73, and pull rod 85 to the brake lever 30, which is thereby turned about the pin 29 for pulling the rod 32 toward the left. The various elements of the brake rigging are thus operated to effect application of the brakes.

It will be understood that while the brake lever 25, pull rods 81 and 85, and brake lever 30 are thus subjected to operating forces, the spacing levers 68 and 73 are free to move about the pivotal connections with the adjusting block members 65 and 66 and with the pins 77 and 76 to compensate for relative displacement of the other brake rigging elements, although the distance separating the pins 80 and 84 is maintained substantially constant.

If the slack in the brake rigging is not excessive, the application of the brakes as just explained will be effected before the piston 15 has been moved far enough to cause engagement of the collar portion 42 thereof with the end of the sleeve member 35. If the brake shoes associated with the brake equipment shown in the drawing have become worn, however, so that the brake rigging elements must be moved to a greater than normal extent to take up the slack, the piston 15 is then moved against the pressure of the spring 19 to bring the collar portion 42 into engagement with the sleeve member for shifting the sleeve member to the left against the force of the spring 39. As the sleeve member 35 is thus shifted from its normal position, the pawl 48 is carried over one or more of the teeth of the ratchet wheel 46, which is meanwhile held against counterclockwise rotation by the pawl 51.

When fluid under pressure is subsequently released from the piston chamber 16 of the brake cylinder device for effecting the release of the brakes, the spring 19 becomes effective to shift the piston 15 toward release position in the usual manner, while the spring 39 at the same time becomes effective to move the sleeve member 35 toward the normal position as illustrated in Fig. 1. As the sleeve member 35 is thus shifted to the right under the force of the spring 39, the pawl 48 acts through the medium of the ratchet wheel 46 to rotate the shaft 45 and worm gear portion 56 thereof in a clockwise direction as viewed in Fig. 1, thereby turning the shaft 58 through the medium of the worm gear portion 57. The shaft 58 and the screw member 60 mounted thereon are thus rotated in a clockwise direction, as viewed in Fig. 2, for drawing the adjusting block element 65 toward the left along the screw thread 61 (see Fig. 1), while simultaneously effecting movement of the adjusting block member 66 toward the right along the screw thread 62. As the adjusting block members 65 and 66 are thus separated, the spacing levers 68 and 73 are turned about the respective pivot pins 77 and 76 for drawing the outer ends of the levers closer together. It will be apparent that with the distance between the pins 80 and 84 thus shortened, the slack in the brake rigging is consequently reduced.

From the foregoing it will be seen that a combination brake cylinder and slack adjuster constructed and arranged according to my invention may be employed with any existing vehicle brake rigging, and is particularly adaptable for use on a modern railway truck having a minimum of space available for a braking apparatus.

Although a preferred embodiment of the invention has been illustrated and described, it is not intended to limit the scope of the invention to that embodiment or otherwise than by the terms of the appended claims.

Having now described my invention, what I claim as new and desire to secure by Letters Patent, is:

1. A combination brake cylinder and slack adjuster for a fluid pressure operated brake rigging, comprising a casing, a piston mounted therein and operatively connected to the brake rigging, a movable member mounted within said casing and operable by said piston upon excessive travel thereof, a spring for biasing said member toward a normal position and opposing displacement thereof by the piston, a ratchet mechanism mounted in said casing and operative on movement of said member by said spring, a longitudinally disposed shaft having one end journaled in said casing and geared to said ratchet and pawl mechanism and the other end extending outwardly of said casing, and lever means mounted in screw-threaded connection with said shaft and operative thereby for taking up slack in the brake rigging.

2. A combination brake cylinder and slack adjuster for a fluid pressure operated brake rigging, comprising a casing, a piston and piston rod mounted therein and operatively connected to the brake rigging, a longitudinally disposed sleeve member surrounding said piston rod and operatively aligned with said piston, a coil spring urging said sleeve member toward a normal position, ratchet and pawl means mounted within said casing and constructed and arranged for operation by said sleeve member under the force of said spring, a longitudinally disposed shaft having one end journaled in said casing and geared to said ratchet and pawl mechanism and the other end extending outwardly of said casing, and lever means mounted in screw-threaded connection with said shaft and operative thereby for taking up slack in the brake rigging.

3. A combination brake cylinder and slack adjuster for a fluid pressure operated brake rigging, comprising a hollow casing structure having an interior annular shoulder, a fluid pressure actuated piston mounted in said casing structure, a release spring interposed between said piston and said annular shoulder, a sleeve member slidably mounted within said annular shoulder and disposed in operative alignment with said piston, a coil spring for urging said sleeve member toward a normal position and for resisting displacement thereof by said piston, a piston rod operatively connecting said piston with the brake rigging, said piston rod being disposed longitudinally within said sleeve member, a ratchet and screw mechanism journaled in said casing structure and operative to take up slack in the brake rigging, and means carried by said sleeve member for actuating said ratchet and screw mechanism when the sleeve member is operated under the force of said coil spring.

4. In a vehicle brake equipment, in combination, a brake cylinder casing structure, a piston and piston rod operatively mounted therein, a floating brake cylinder lever pivotally connected to said piston rod and operative to apply the brakes, a dead brake cylinder lever pivotally connected to said casing structure and operative to apply the brakes, an adjustable connecting rod assembly operatively connecting said dead brake cylinder lever and said floating brake cylinder lever for rendering said levers cooperative in effecting application of the brakes, and slack take-up mechanism operatively mounted in said casing structure and constructed and arranged for operation by said piston upon excessive travel thereof to effect compensating adjustment of said connecting rod assembly.

5. In a brake equipment for a railway truck, in combination, a casing structure including a brake cylinder portion and a slack adjuster portion, a brake cylinder piston mounted in said brake cylinder portion, a slack adjuster mechanism mounted in said slack adjuster portion and operative by said piston upon excessive travel thereof, a screw-threaded shaft rotatable by said mechanism and projecting outwardly of said casing structure, a live brake cylinder lever operatively connected to said brake cylinder piston, a dead brake cylinder lever pivotally connected to said casing structure, spaced tie rods pivotally connected to the respective live and dead levers intermediate the ends thereof, and a pair of centrally pivoted spacing levers having their inner ends operatively connected to said screw-threaded shaft and their outer ends pivotally connected to said tie rods, respectively.

6. A combination brake cylinder and slack adjuster for a fluid pressure operated brake rigging, comprising a casing, a piston mounted therein and operatively connected to the brake rigging, a movable member mounted within said casing and operable by said piston upon excessive travel thereof, a spring for biasing said member toward a normal position and opposing displacement thereof by the piston, a ratchet mechanism mounted in said casing and operative on movement of said member by said spring, a rotary shaft disposed longitudinally of and closely adjacent an outer wall of said casing, said shaft having one end journaled in a portion of said casing and geared to said ratchet mechanism, and lever means mounted in screw-threaded connection with said shaft and operative thereby for taking up slack in the brake rigging.

7. In a vehicle brake system of the type having a live lever and a dead lever forming a part of the brake rigging in the system and a brake cylinder having a piston therein connected to one of said levers, in combination, adjustable means interconnecting said live and dead levers for operating one with the other and being adjustable to take up the slack in the brake rigging connected to the levers, and means disposed in the brake cylinder and mechanically actuated by the piston in said brake cylinder for controlling said adjustable means.

8. In a vehicle brake system of the type having a live lever and a dead lever forming a part of the brake rigging in the system and a brake cylinder having a piston therein connected to one of said levers, in combination, adjustable means interconnecting said live and dead levers for operating one with the other and being adjustable to take up the slack in the brake rigging connected to the levers, and means engageable by the piston upon excessive movement thereof due to slack in the brake rigging for operating said adjustable means.

CLYDE C. FARMER.